United States Patent [19]
Albanese

[11] 3,985,152
[45] Oct. 12, 1976

[54] UNDER FIXTURE VALVE

[76] Inventor: Thomas Albanese, 116 Norlen St., Las Vegas, Nev. 89107

[22] Filed: May 19, 1975

[21] Appl. No.: 578,475

[52] U.S. Cl. .............................. 137/360; 251/309
[51] Int. Cl.² ........................................ F16K 5/04
[58] Field of Search ............ 137/360, 375; 251/181, 251/172, 309

[56] References Cited
UNITED STATES PATENTS

| | | | |
|---|---|---|---|
| 454,234 | 6/1891 | Stafford et al. ...................... | 251/181 |
| 491,469 | 2/1893 | Carver ............................ | 251/181 X |
| 3,329,397 | 7/1967 | Neuworth ....................... | 251/309 X |
| 3,532,123 | 10/1970 | Anthony ......................... | 251/172 X |
| 3,627,258 | 12/1971 | Scaramucci..................... | 251/309 X |
| 3,760,836 | 9/1973 | Albanese ........................... | 137/360 |
| 3,799,499 | 3/1974 | Shur................................. | 251/309 X |

FOREIGN PATENTS OR APPLICATIONS

| | | | |
|---|---|---|---|
| 869,886 | 5/1971 | Canada................................ | 137/375 |

*Primary Examiner*—Alan Cohan
*Attorney, Agent, or Firm*—Ralph B. Pastoriza

[57] ABSTRACT

An under-fixture valve comprises an elongated body having an outer diameter corresponding to the pipes normally connected to an outlet water pipe so that the valve body may be threaded to the outlet water pipe and project from a wall structure. The wall structure itself can then be completed and finished with a minimum of interference with the valve body, the valve being closed while work on the wall is completed so that the main water supply may be left on. An integrally molded plastic valve member defines a chamber serving as a valve seat for a valve head adapted to be inserted into a side opening in the valve member, the device when assembled having no laterally projecting portions.

5 Claims, 4 Drawing Figures

UNDER FIXTURE VALVE

This invention relates to an improved under-fixture valve designed to save a plumber's time in the installation of plumbing fixtures such as sinks.

BACKGROUND OF THE INVENTION

It is normal practice to provide an under-fixture valve for connection between a water supply pipe within a wall structure and a fixture pipe leading up to the normal manually operable valve at the fixture. For example, in conventional sinks utilized in offices and homes there is provided a shut-off valve beneath the sink which will permit a person to close off the water supply to the normal valves on the sink so that new washers or other repairs may be made without having to shut off the main water supply.

In the original construction of bathrooms or laboratories where a sink might be used, it is common practice to provide a short pipe section which is connected to the main water supply pipe in the wall, the short section extending laterally from the wall. Finishing operations on the wall are then completed about the short pipe section such as lathing and plastering or insertion of tile. During this finishing operation, it is necessary to turn off the main water supply to prevent flooding of the area. After the wall has been finished, the plumber may then fix the normal under-fixture valve to the short pipe section and connect it up to the sink. After this operation, the plumber will go down to the main water supply valve and turn on the water supply.

The necessity for having to travel down to the main water supply and turn it on after the wall construction and connection of a fixture has been completed is a waste of the plumber's time. Moreover, in the case of multiple dwellings, there may be other plumbing pipes extending from wall structures wherein the wall construction itself has not been completed and inadvertent turning on of the main water supply may flood other areas. The latter problem can be overcome by simply threading a closure end to the extending pipe section from the wall so that the main water supply may remain on while the wall construction is being completed. In this way other areas in which construction has been completed are not inconvenienced by lack of water. On the other hand, after the one wall construction has been completed and it is desired to connect the normal under-fixture valve the plumber must still temporarily turn off the main water supply while these connections are being effected.

One solution to the foregoing inconveniences would be for the plumber simply to attach the under-fixture valve to the protruding pipe section of the wall and turn it to an off position so that the water supply may be left on while he is finishing the wall area or while a tile man is completing his work. However, this solution is not practical with present day under-fixture valves because of the relative bulkiness of these valves. Thus there are various lateral projections or enlarged portions of the valve which interfere with finishing of a wall, particularly in the placing of tile about the projecting pipe.

In my U.S. Pat. No. 3,760,836 issued Sept. 25, 1973 there is disclosed an improved under-fixture valve so designed as not to have any projecting portions extending beyond the diameter of the valve body itself, this diameter corresponding substantially to that of the water supply pipe protruding from the wall. By this arrangement, finishing operations can be carried out with a minimum of interference.

While the particular under-fixture valve described in my above referred-to U.S. patent solves the problem, the valve itself involves a plurality of components, particularly the valve member serving as a seat for a spherical valve head this member being formed of separable rubber gaskets. It would be desirable if an improved under-fixture valve could be provided similar to that described in my U.S. patent but which involves a lesser number of component parts thereby not only increasing reliability but reducing the expense of manufacturing the valve.

BRIEF DESCRIPTION OF THE PRESENT INVENTION

With the foregoing considerations in mind, the present invention contemplates an under fixture valve incorporating an improved structure over that described in my above referred-to U.S. patent, the valve solving all of the problems of the under-fixture valve in my said patent in that it will not take up any more room than a normal pipe section heretofore utilized to which a conventional under-fixture type valve would be connected.

More particularly, the under-fixture valve comprises an elongated valve body exteriorly threaded at each end and having a first side opening of given diameter intermediate its ends and a second diametrically opposite side opening of smaller diameter.

An integrally molded plastic member of cylindrical shape is receivable in the valve body and defines a valve head seating chamber for receiving a valve head through the first side opening of the valve body. The valve head has a flow passage which may be oriented within the valve member seating chamber in alignment or out of alignment with a longitudinal bore through the integrally molded plastic member to provide the desired valve action.

By providing an integral molded plastic member defining the valve head chamber and seat, annular ribs may be formed about openings in the member during the molding operation, thus eliminating the necessity for O-rings at these points and also eliminating the heretofore provided separate gasket structures used in my referred to U.S. patent.

BRIEF DESCRIPTION OF THE DRAWINGS

A beter understanding of this invention as well as many further features and advantages will be had by now referring to the accompanying drawings in which.

DETAILED DESCRIPTION OF THE PREFERRED EMBODIMENT

Figure 1:
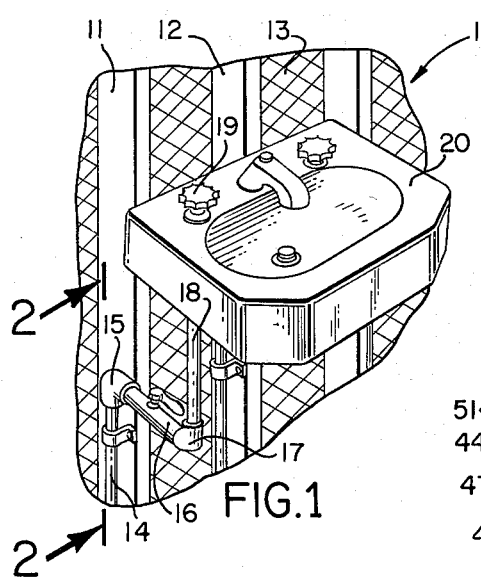
FIG. 1 is a fragmentary perspective view of a typical sink fixture with which the under-fixture valve of the present invention would be used, part of the wall structure for the sink being broken away to facilitate explanation of the invention.

Referring first to FIG. 1 there is designated generally by the numeral 10 an incompleted wall structure which might include studs 11 and 12 with backing tar paper or other material 13. Shown secured to the inside of the stud 11 is a water supply pipe 14 provided with an elbow 15 to which the improved under-fixture valve 16 of this invention is threaded such that the valve 16 projects from the wall structure. To facilitate an understanding of the environment, the valve 16 is shown connected at its other end by elbow 17 to a fixture pipe 18 leading up to a conventional hand operated valve 19 on a sink 20. Normally, these latter connections are not made until after the wall structure 10 is completely finished.

Figure 2:
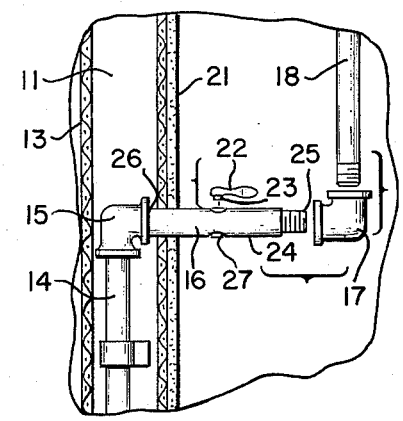
FIG. 2 is a fragmentary cross section partly exploded of the under-fixture valve and associated plumbing looking generally in the direction of the arrows 2—2 of FIG. 1.

Thus, referring to FIG. 2 there is shown the valve body 16 surrounded by the finished wall which might include lathe and plastering 21 or tile work. After the wall is finished, a manual turning means in the form of a handle 22 having a projecting flat 23 may be received in a first side opening 24 in the valve body 16. As described, the elbow 17 and pipe 18 leading to the sink fixture are then assembled.

As also described heretofore, it would be normal practice to provide a short pipe section threaded to the elbow 15 to project out from the incomplete wall structure. Thereafter the wall structure is finished with a minimum of interference with the short pipe section and then the conventional type of under-fixture valve is assembled to the projecting pipe section. Because of the unique design of the improved under-fixture valve 16 of the present invention, this valve replaces the short pipe section in providing a projecting portion from the wall about which the wall itself may be completed and finished. Since the valve body has a dimension corresponding substantially to that of the pipe section conventionally secured to the water supply pipe 14, it is a very simple matter to complete and finish the wall as shown at 21 while the main water supply is simply left on. Subsequently, connection to the sink fixture can then take place without the necessity of having to turn off the main water supply. In other words, the under-fixture valve 16 of the present invention serves a dual function in that it enables the wall structure to be completed and finished without interference while the water supply is left on, the valve itself serving as a substitute for the short pipe section, and also constitutes the under-fixture valve itself.

Figure 3:
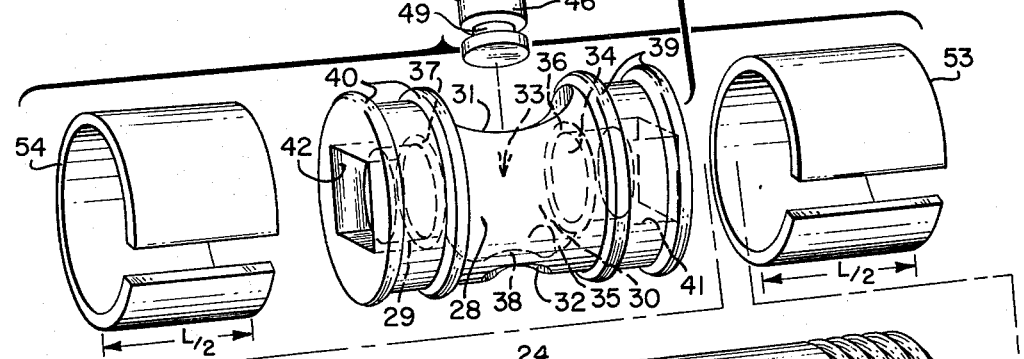
FIG. 3 is an exploded perspective view of the under-fixture valve illustrating the various components making up the valve; and, FIG. 4 is a longitudinal cross section of the under-fixture valve with the exploded components of FIG. 3 in assembled relationship.
Figure 3:
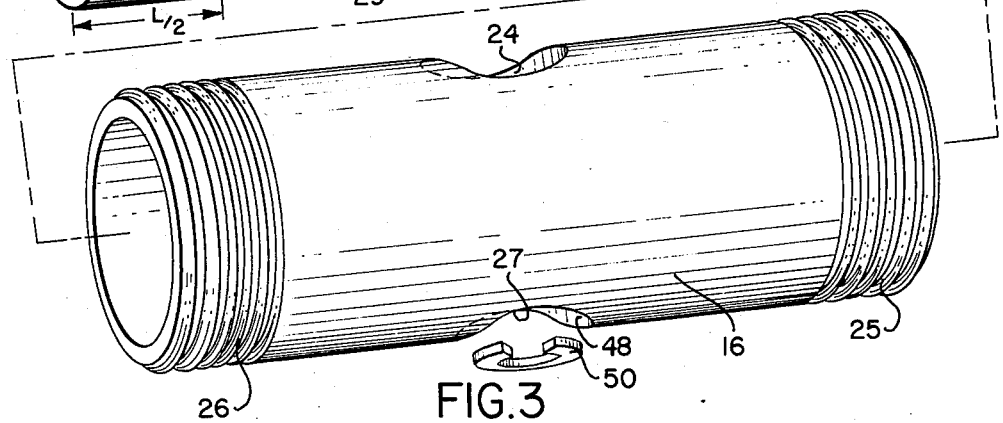

Referring now to FIG. 3, details of the under-fixture valve body 16 will be described. As shown, the valve includes an elongated valve body substantially the same as a short pipe section exteriorally threaded at each end as at 25 and 26. Wrench flats (not shown) may be provided on the outer surface of the valve body 16 to facilitate threading the same to the outlet water pipe in a wall. The valve body has a straight through water passage from one end to the other, the side opening described in FIG. 2 and designated 24 constituting a first side opening of a given diameter intermediate the ends of the valve body. This valve body also includes a second diametrically opposite side opening 27 of smaller diameter than the given diameter for the side opening 24.

Referring to the exploded portion of the valve structure above the valve body 16 there is shown an integrally molded plastic member 28 of cylindrical shape receivable in the valve body and having a longitudinal bore 29 therethrough and a transverse passage 30 entering the plastic member through an entrance side opening 31. This passage exits from the plastic member through a diametrically opposite exit side opening 32. The diameters of the entrance opening 31 and the exit opening 32 are the same as the given diameter and smaller diameter of the valve body side openings 24 and 27.

The longitudinal bore 30 in the plastic body 28 intercepts the passage from the entrance side opening 31 to define a valve chamber 33 having a cylindrically shaped wall portion 34 surrounding the entrance opening 31 tapering inwardly to define a concave hemispherical shape 35 surrounding the exit opening 32. As indicated by the dashed phantom lines, the peripheral edges of the openings of the longitudinal bore 29 intercepting opposite portions of the wall defining the valve chamber 33 and the inner peripheral edge of the exit opening 32, extend beyond the wall surfaces lightly to define annular ribs 36, 37 and 38 respectively, these ribs functioning as O-rings at the respective openings.

Opposite exterior end portions of the integrally molded plastic member 28 each include a pair of longitudinally spaced annular ribs 39 and 40 integrally formed to serve as sealing O-rings against the inside wall of the valve body 16 when the plastic member is assembled therein.

The molded plastic valve member finally includes at the beginning and end portions of the longitudinal bore 29 at its opposite ends square cross sectional portions 41 and 42. These portions enable a tool to be received in either end of the valve body 16 when the plastic member 28 is assembled therein to engage in the square cross section and rotate the plastic member relative to the valve body to aa position in which the entrance and exit openings 31 and 32 of the valve member are in exact registration with the first and second side openings 24 and 27 of the valve body 16.

Still referring to the exploded view of FIG. 3 there is shown above and to one side of the plastic member 28 a valve head 43. This valve head includes an upper exterior cylindrical wall portion 44 tapering inwardly to define a convex hemispherical shape 45 terminating in a smaller lower cylindrical stem 46. The valve head is provided with a flow passage 47 passing diametrically therethrough from one side to the other.

The dimensioning of the valve head 43 is such that the same may be transversely received in the entrance side opening 31 of the valve member 28, the lower stem portion 46 protruding out the exit opening 32 of the valve member. It will be understood that this insertion takes place after the valve member is assembled within the valve body 16 with its side openings in registration with the side openings of the valve body 16 as described.

To secure the valve head within the valve member seating chamber 33, the second side opening 27 of the valve body 16 is provided with a recessed area 48, the stem 46 extending into and terminating within this recessed area. As shown, the stem 46 includes an annular groove 49. A spring type washer 50 shown in the lower portion of the exploded view of FIG. 3 is arranged to be received in this groove and exert a biasing force on the valve head tending to pull it further through the second opening 27 thereby securely seating the cylindrical and hemispherical portions of the valve head against the annular ribs 36, 37 and 38 in the valve chamber 33.

The upper portion of the valve head 43 is provided with an annular groove 51 receiving a sealing O-ring 52.

The preferred embodiment of the valve is completed by the provision of first and second split spacing collars 53 and 54 internally receivable in opposite ends of the valve body 16 to seat respectively against the outer ones of the pairs of annular ribs 39 and 40 on opposite end portions of the plastic member 28.

Figure 4:
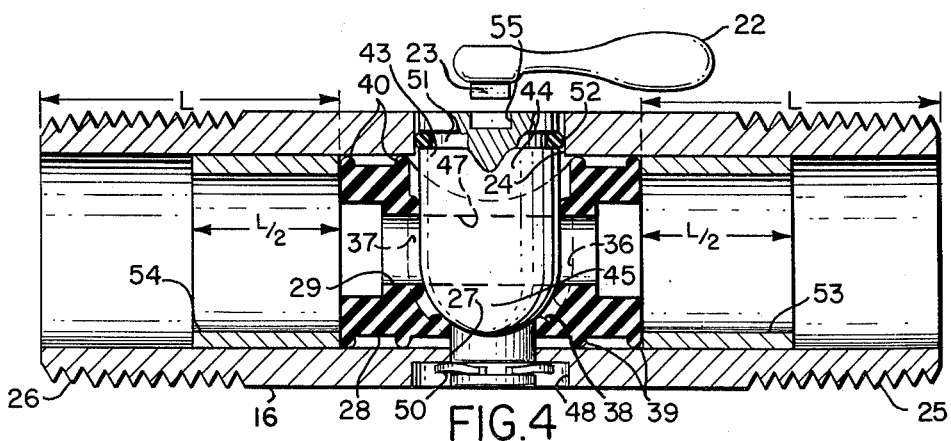

Referring now to the longitudinal cross section of FIG. 4, the manner in which the heretofore described components of the valve are assembled will be evident.

Thus, the plastic member 28 is shown positioned within the valve body 16 with its entrance and exit side openings in registration with the first and second side openings of the valve body and with the valve head 43 positioned within the seating chamber of the plastic member. In FIG. 4, the engagement of the cylindrical exterior wall 44 and convex hemispherical wall 45 of the valve head with the annular ribs 36 and 37 surrounding the edges of the openings, defined by the interception of the bore 29 with the valve chamber as well as with the annular rib 38 about the exit opening in the plastic member 28 are shown. Thus, the valve head is held actually spaced from the cylindrical wall and concave hemispherical portion of the valve chamber in the plastic member by these annular ribs which function more or less as O-rings so that very little friction is encountered in rotating the valve head 43 about a vertical axis as viewed in FIG. 4.

In addition, the manner in which the spring washer 50 cooperates with the valve stem and recessed area 48 to secure the valve head in position is shown.

It will further be noted that the upper cylindrical portion of the valve head 43 does not extend beyond the side wall of the valve body 16 and that the O-ring 52 engages the inner wall of the side opening 24 in the valve body 16.

Finally, it will be noted that the split spacing collars 53 and 54 are received within the opposite ends of the valve body 16 and are of a length one half the distance between the outer annular ribs of the pairs of ribs 39 and 40 and the extreme ends of the valve body 16. Thus, the length of the split collars is designated L/2 while the distance between the ends of the plastic member and extreme opposite ends of the valve body 16 is designated L. The split spacing collars are not an essential part of this invention but are very useful in the event it is desired to insert an on-off valve in any pipe section. For example, the valve body 16 may easily be inserted in a pipe by cutting a section from the pipe of length equal to the distance between the far ends of the split collars. One of the split collars is then removed from one end of the valve body and that end is slid over a portion of the cut end of the pipe until the cut end engages the outer one of the dual annular ribs against which the removed collar was originally seated. The other end of the valve body may then be slid over the other end of the cut pipe until this other end seats against the far end of the remaining collar so that the valve body and valve member are precisely centrally located between the cut ends of the pipe. The cut ends may then be permanently secured to the valve body.

Also shown in the upper portion of FIG. 4 at the upper end of the valve head 43 is a slot 55 which is arranged to receive the flat 23 of the turning handle 22 when it is desired to rotate the valve head.

In the position illustrated in FIG. 4, the valve head passage 47 is in alignment with the bore 29 in the plastic member 28. By rotating the valve head 43 about an axis perpendicular to the axis of the bore and valve body 16 through 90°, the passage 47 is no longer in alignment with the bore and water flow through the valve body is blocked.

OPERATION

In operation, after the valve body has been assembled as described in FIG. 4, it may be threaded directly to a water supply pipe such as illustrated in FIG. 2. The position of the valve head 43 is such that the passage 47 is transverse to the straight through water passage and bore 29 so that the valve is off. In other words, the valve head is rotated to a position 90° from that illustrated in FIG. 4. The handle 22 is not connected to the valve body 16 so that the valve body simply protrudes from the incomplete wall structure without occupying any more area than if a simple pipe section locating the water supply pipe were provided.

The main water supply may be turned on and left on and the wall structure itself completed and finished as by tiling or any other suitable finish all as described heretofore. Because of the minimal dimensions of the valve body 16, this work may be completed with a minimum of interference.

After the wall has been completed, it is not at all necessary for the plumber to turn off the main water supply while he connects up a fixture such as a sink. Rather, the plumber can simply complete these connections and thereafter simply turn on the under fixture valve. In this respect, if desired, the plumber may provide a handle such as 22 so that in the future, the under-fixture valve may be manually opened or closed as in the case of a conventional type under-fixture valve. Since the wall finishing has all been completed, the provision of a handle will in no way interfere with other work in the area.

It will be evident from the foregoing description that the improved under-fixture valve of this invention has advantages over that described in my heretofore referred-to U.S. patent. In particular, the provision of the single molded plastic member defining the valve head seating chamber as stated provides not only O-ring action as a consequence of being a molded product but constitutes a single integral element as opposed to a plurality of components defining an appropriate valve head chamber and valve seats. Moreover, the pairs of annular ribs on the exterior opposite end portions of the plastic molded valve member avoid the necessity of separate O-rings at these points.

It should be understood that while the valve member has been referred to as a molded plastic member, the term is meant to include a rubber product which could be similarly molded.

What is claimed is:

1. An under-fixture valve for threaded connection at one end to an outlet water pipe within a wall structure and at its other end to a fixture pipe leading to an overhead fixture, comprising, in combination:

a. a pipe section constituting an elongated valve body exteriorally threaded at each end and of a dimension corresponding substantially to that of piping designed to connect to the outlet water pipe so that said body may be threaded to the outlet waterpipe and projected from the wall structure without any laterally projecting structure and the wall structure itself completed and finished with a minimum of interference with the valve body, said valve body having a first side opening of given diameter intermediate its ends and a second diametrically opposite side opening of smaller diameter;

b. an integrally molded plastic member of cylindrical shape receivable in one end opening of said valve body and having a longitudinal bore therethrough and a transverse passage entering the plastic member through an entrance side opening of given diameter and exiting from the member through a diametrically opposite exit side opening of smaller diameter, said diameters corresponding respectively to said first mentioned given diameter and smaller diameter of said valve body and being positioned in registration therewith, said passage in said plastic member intercepting said longitudinal bore to define a valve chamber in their common volumes having a cylindrically shaped wall portion surrounding said entrance opening tapering inwardly to define a concave hemispherical shape surrounding the exit opening, the peripheral edges of the longitudinal bore openings intercepting opposite portions of the wall defining said valve chamber in said plastic member and the inner peripheral edge of said exit opening, extending beyond the wall surfaces slightly to define annular ribs surrounding said bore openings and exit opening to serve as O-rings;

c. a valve head having an upper exterior cylindrical wall portion tapering inwardly to define a convex hemispherical shape terminating in a smaller cylindrical stem and having a flow passage passing diametrically therethrogh from one side to the other, said valve head being receivable through said first side opening of given diameter in said valve body and said registering entrance opening in said plastic member to seat in said valve chamber with its cylindrical stem passing through said exit opening and into said second side opening of smaller diameter in said valve body, the upper end of said cylindrical wall portion of said valve head terminating within said first side opening of given diameter in said valve body and including an annular groove with an O-ring seated in said groove to provide a water seal at said side opening, the exterior cylindrical and hemispherical surface of said valve head engaging said annular ribs surrounding said bore openings and exit opening, rotation of the valve head about an axis perpendicular to the longitudinal axis of the bore through said plastic member when positioned in said valve chamber to a first position aligning said flow passage with said bore to pass water through said valve body and rotation of said valve head 90° from said first position to a second position moving said flow passage out of alignment with said bore to block the flow of water through said valve body, said second side opening in said valve body including a recessed area at its outer edge, said stem of said valve head extending into and terminating in said recessed area and having an annular groove; and, d. a spring washer receivable in said groove and recessed area shaped to exert a spring force against said stem tending to pull it further through said exit opening and registering second side opening to thereby hold said valve head in secure seating engagement with said annular ribs in said valve chamber whereby said valve head when positioned in said plastic body has its upper end and lower stem flush with the outer surface of said valve body, said valve head additionally serving to hold said integrally molded plastic member against longitudinal movement in said valve body.

2. An under-fixture valve according to claim 1, in which opposite exterior end portions of said integrally molded plastic member each include a pair of longitudinally spaced annular ribs integrally formed to serve as sealing O-rings against the inside wall of said valve body.

3. An under-fixture valve according to claim 1 in which the central portion of the upper end of said valve head includes a cross-slot for receiving a flat on a turning handle for rotating said valve head.

4. An under-fixture valve according to claim 2, in which the beginning and end portions of said longitudinal bore in said plastic member at its opposite ends are of square cross section to enable a tool to be received in either end of said valve body to engage in said square cross section and rotate said plastic member relative to said valve body prior to insertion of said valve head to insure registration of said entrance and exit openings in said valve member with said first and second side openings in said valve body respectively.

5. An under-fixture valve according to claim 2, including first and second split spacing collars internally receivable in opposite ends of said valve body to seat respectively against the outer ones of the pairs of annular ribs on opposite end portions of said plastic member, the length of each collar equalling one-half the distance between the outer annular rib seating the collar and the end of the valve body receiving the collar so that said valve body may be easily inserted in a pipe by cutting a section from the pipe of length equal to the distance between the far ends of the split collars, removing the split collar from one end of the valve body and sliding that end over a cut end of the pipe until the cut end engages the annular rib against which the removed collar was originally seated, and the sliding the other end of the valve body over the other cut end of the pipe until the other end seats against the far end of the remaining collar so that the valve body is precisely centrally located between the cut ends of the pipe, the cut ends then being permanently secured to the valve body.

* * * * *